United States Patent [19]

Goodrich, Jr. et al.

[11] Patent Number: 4,607,331
[45] Date of Patent: Aug. 19, 1986

[54] METHOD AND APPARATUS FOR IMPLEMENTING AN ALGORITHM ASSOCIATED WITH STORED INFORMATION

[75] Inventors: Edgar R. Goodrich, Jr., Lubbock; Douglas R. Kraft, Austin, both of Tex.

[73] Assignee: Motorola, Inc., Schaumburg, Ill.

[21] Appl. No.: 494,157

[22] Filed: May 13, 1983

[51] Int. Cl.⁴ .................. G06F 12/02; G06F 12/08; G06F 12/12

[52] U.S. Cl. .................................................. 364/200

[58] Field of Search ... 364/200 MS File, 900 MS File

[56] References Cited

U.S. PATENT DOCUMENTS

| | | | |
|---|---|---|---|
| 3,958,228 | 5/1976 | Coombes et al. | 364/200 |
| 3,967,247 | 6/1976 | Andersen | 364/200 |
| 4,332,010 | 5/1982 | Messina et al. | 364/200 |
| 4,400,770 | 8/1983 | Chan et al. | 364/200 |
| 4,403,288 | 9/1983 | Christian et al. | 364/200 |

*Primary Examiner*—David Y. Eng
*Attorney, Agent, or Firm*—Anthony J. Sarli, Jr.; Jeffrey Van Myers; Robert L. King

[57] ABSTRACT

A circuit and method for implementing a predetermined data replacement algorithm associated with a fast, low capacity cache, such as least recently used (LRU), which is fast and which minimizes circuitry is provided. A latch stores the present status of the replacement algorithm, and an address control signal indicates which one of n sets of stored information in the cache has been most recently accessed, where n is an integer. The predetermined algorithm is implemented by a predetermined permutation table stored in a translator which provides an output signal in response to both the present status of the replacement algorithm and the address control signal. The output signal indicates which one of the n sets of stored information in the cache may be replaced with new information.

11 Claims, 5 Drawing Figures

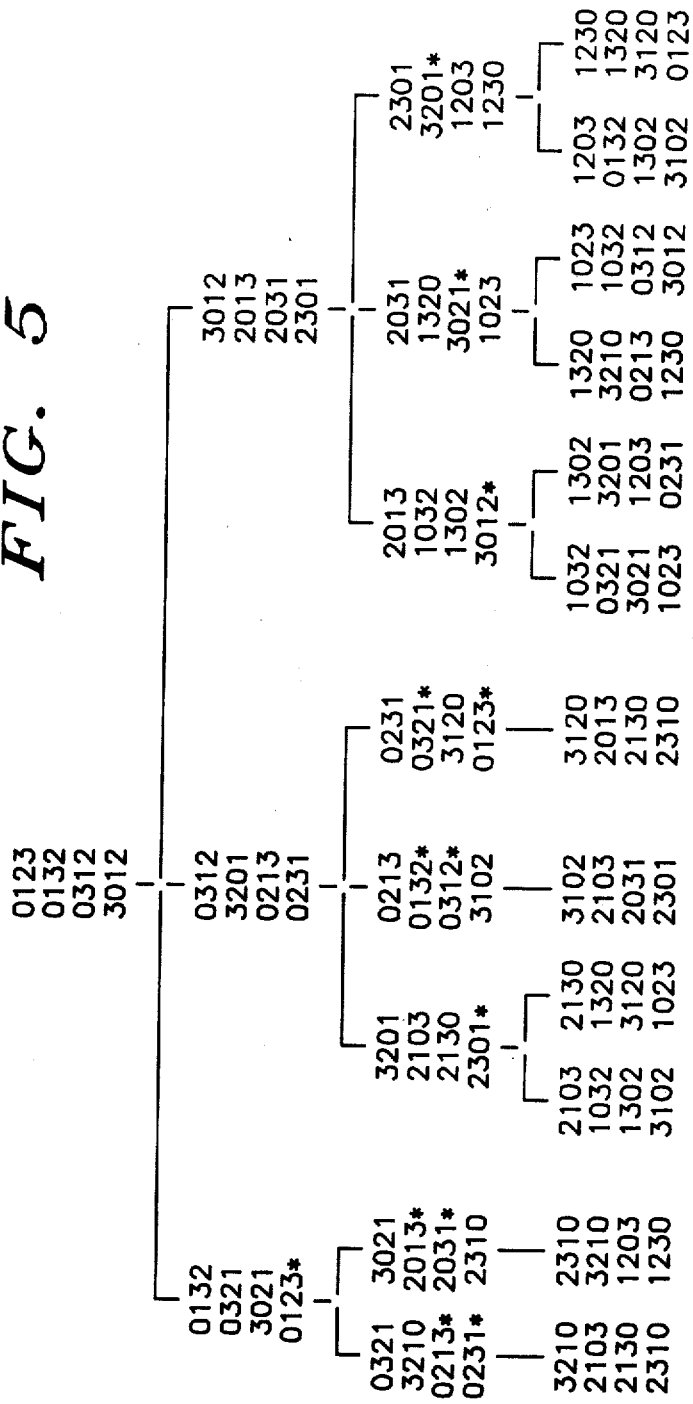

METHOD AND APPARATUS FOR IMPLEMENTING AN ALGORITHM ASSOCIATED WITH STORED INFORMATION

TECHNICAL FIELD

This invention relates generally to an information storage system and, more particularly, to implementing an algorithm associated with an information storage system by using a permutation network.

BACKGROUND ART

Information storage and retrieval systems may have a cache for storing and providing data. In a cache, information is stored in predetermined sets which are defined by address locations. When the cache becomes full and additional storage is needed for information, an algorithm is commonly used to determine which existing information in the cache is to be replaced and substituted by new information. Examples of well known replacement algorithms which are utilized are first-in first-out (FIFO) and least recently used (LRU). The LRU algorithm identifies the information to be replaced and classifies the new information as the most recently used (MRU). Others have implemented the LRU replacement algorithm with computer software. However, software implemented algorithms are typically very slow. One known hardware implementation of an LRU algorithm utilizes what is typically referred to as a "push-down" stack. A rank ordered plurality of stacked storage registers is coupled in series to calculate the most recently used to least recently used sets of information. The storage registers require initialization via an initializer to establish an initial status. Additional hardware is used to randomly access any addressed register and to couple the contents of that register to the MRU register while coupling the contents of all registers having a rank which is higher than the accessed register to the next lower register. The registers of lower rank than the randomly accessed register are unaffected. Priority identification bits are required to identify the rank of each information set. The number of priority identification bits is directly proportional to the number of sets. Further, the number of registers of each set equals the total number of sets. Therefore, the circuit board area required increases proportionately with the number of sets added. Since at all times the lowest ranked register of the stack contains the identification of information which is least recently used, when new information needs to be stored in an address location, the information in the LRU set is disposed of. A primary disadvantage with using the stack of rank ordered registers is the space and number of electronic parts required to implement the replacement algorithm.

SUMMARY OF THE INVENTION

Accordingly, an object of this invention is to provide an improved method and apparatus for implementing an algorithm associated with an information storage system.

Another object of this invention is to implement a least recently used (LRU) algorithm for a cache with an apparatus which utilizes a permutation network.

Yet another object of this invention is to provide a method of using a pre-calculated permutation network to implement a replacement algorithm for a memory which minimizes circuit space.

In carrying out the above and other objects, there is provided, in one form, a method and apparatus for implementing a replacement algorithm for n sets of stored information, where n is an integer. Translation means for implementing the algorithm are provided. The translation means have a predetermined number of address locations in which are stored precalculated permutations of a binary number. The binary number has a bit length which is large enough to represent n! permutations. The translation means provide a predetermined one of the precalculated permutations in response to both a control signal and the previous precalculated permutation. Any arbitrary permutation of the number may be used as an initial condition for the translation means. The precalculated permutation number provided at the output of the translation means implements the replacement algorithm.

The above and other objects, features and advantages of the present invention will be more clearly understood from the following detailed description taken in conjunction with the accompanying drawings.

BRIEF DESCRIPTION OF THE DRAWINGS

FIG. 5 illustrates in table form precalculated permutations of a binary number used to implement a replacement algorithm.

DETAILED DESCRIPTION OF THE PREFERRED EMBODIMENT

Figure 1:
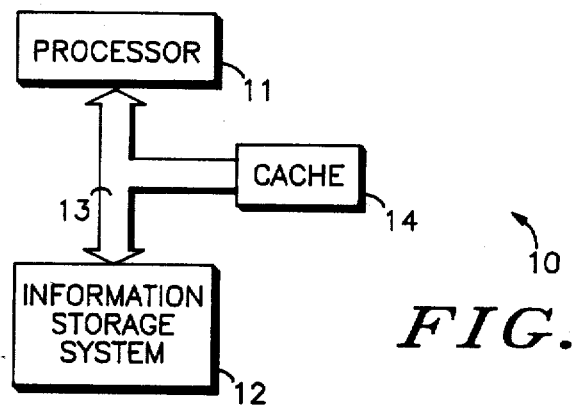
FIG. 1 illustrates in block diagram form a system which uses a replacement algorithm.

Shown in FIG. 1 is an information processing system 10 comprising a processor 11 coupled to an information storage system 12 via channel means 13. A cache 14 is coupled to channel means 13 and both processor 11 and information storage system 12. Cache 14 is typically a small, fast memory which is coupled to a slower main memory (not shown) of processor 11. Frequently used information may be stored in cache 14 to permit operations with the information at a speed which is comparable to the speed of processor 11. In this manner, the number of accesses to the slower main memory is reduced. However, since cache 14 is typically a small memory, not enough memory exists to keep all the information. Therefore, some of the information must be replaced. This is typically accomplished by using a replacement algorithm such as first-in first-out (FIFO) or least recently used (LRU). A FIFO algorithm replaces the first or oldest entry into the memory to make room for the newest data. Whereas, an LRU algorithm replaces the least recently used data to make room for the newest data. Such algorithms are typically implemented either by computer software or by additional circuitry.

Figure 2:
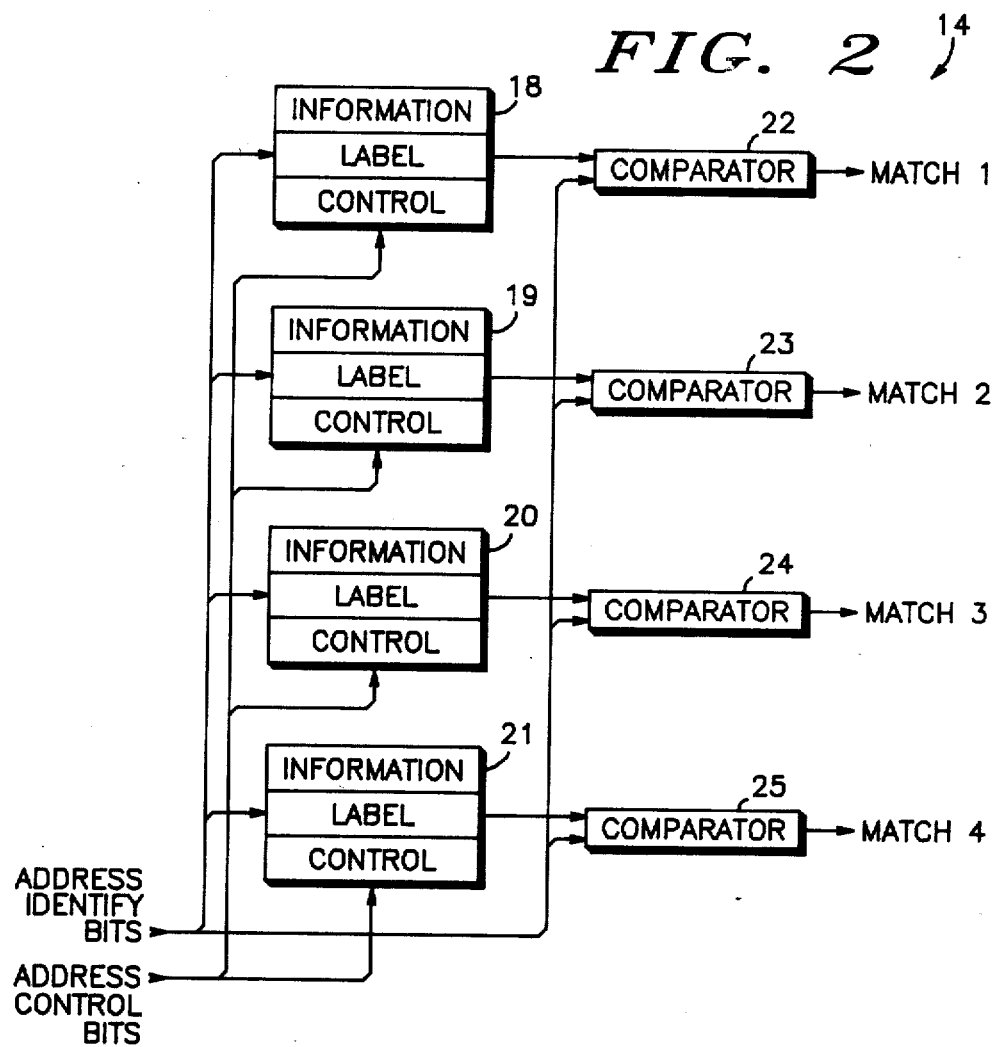
FIG. 2 illustrates in block diagram form a cache having sets of stored information.

Shown in FIG. 2 is an example of one of many implementations of cache 14. Cache 14 is divided into four sets 18, 19, 20 and 21 of stored information. Each set has an information field of a predetermined number of bits, a label field which identifies the address location of the data, and a control field for verifying the accuracy of the data. Although in a preferred form, four sets of stored information are shown, any integer number n of sets may be used. A predetermined number of address identify bits are coupled to the label field of each of the sets 18–21 and to a first input of comparators 22, 23, 24 and 25. An output of the label field of set 18 is coupled to a second input of comparator 22. An output of the label field of set 19 is coupled to a second input of comparator 23. An output of the label field of set 20 is coupled to a second input of comparator 24, and an output of the label field of set 21 is coupled to a second input of comparator 25. The present address bits are compared with address bits from the label fields of sets 18–21. The outputs of comparators 22–25 are respectively labeled Match 1, Match 2, Match 3 and Match 4 and indicate whether or not the address which is currently being addressed is located in any one of sets 18–21, respectively. The data and control field paths are not indicated to simplify the discussion for the purposes of the present invention.

Figure 3:
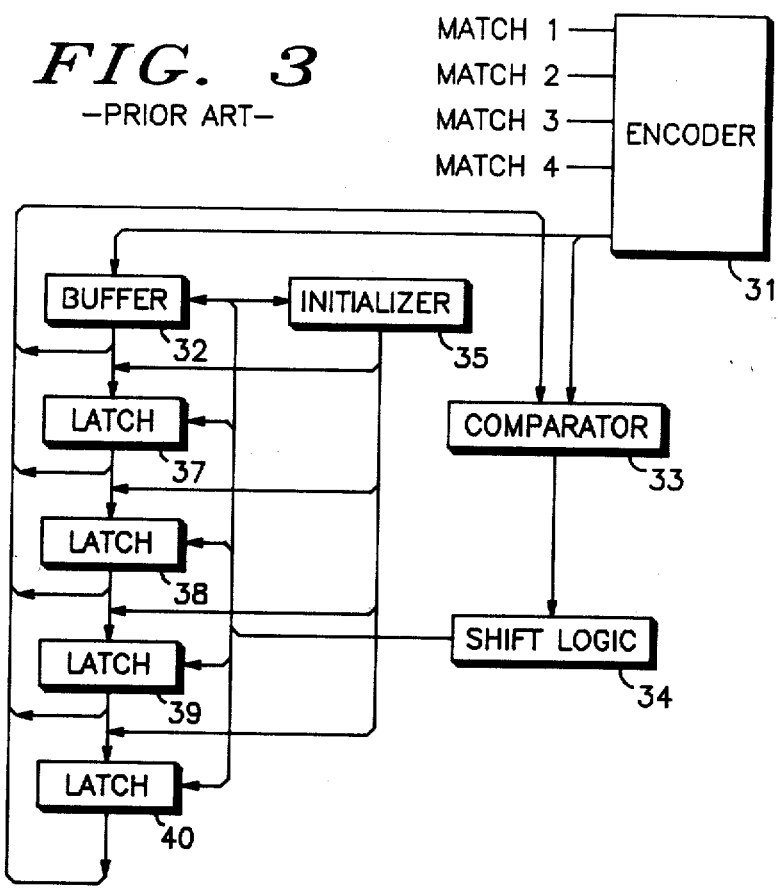
FIG. 3 illustrates in block diagram form a push-down stack of storage registers known in the art for implementing a replacement algorithm.

Shown in FIG. 3 is a known push-down stack for implementing a replacement algorithm for a storage means such as cache 14. An encoder 31 has four inputs for receiving the information from the output of comparators 22–25, respectively, of FIG. 2. The information is encoded and coupled to both a first input of a buffer 32 and a first input of a comparator 33. An output of comparator 33 is coupled to an input of shift logic circuitry 34. An output of shift logic circuitry 34 is coupled to a second input of buffer 32 and to a first input of an initialzer 35 and four latches 37, 38, 39 and 40. An output of initializer 35 is coupled to a second input of latches 37, 38, 39 and 40. An output of buffer 32 is coupled to both the second input of latch 37 and to a second input of comparator 33. An output of latch 37 is coupled to both the second input of latch 38 and the second input of comparator 33. An output of latch 38 is coupled to both the second input of latch 39 and the second input of comparator 33. An output latch 39 is coupled to both the second input of latch 40 and the second input of comparator 33. An output of latch 40 is coupled to the second input of comparator 33.

In operation, the output of each of buffer 32 and latches 37–40 is coupled to comparator 33. The outputs of buffer 32 and latches 37–40 are compared with the output of encoder 31 by comparator 33. The output of comparator 33 indicates which set of stored information is being addressed and is coupled to shift logic circuit 34. Buffer 32 is used in conjunction with shift logic circuit 34 to remove the set identification of the set being addressed from one of latches 37–40 and move the set identification to latch 37. Simultaneously, the contents of the latches immediately above the latch which was addressed are shifted down to the next lower latch. In this manner, the contents of latch 40 are always the least recently used. A disadvantage with the push-down stack of FIG. 3 is the fact that substantial circuitry is required.

Figure 4:
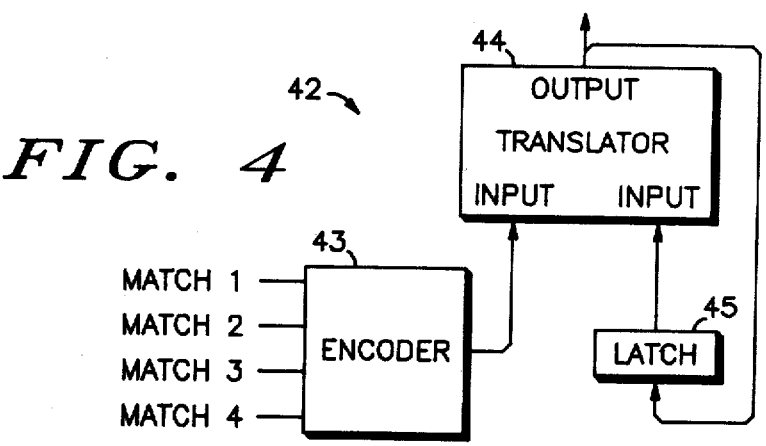
FIG. 4 illustrates in block diagram form a replacement algorithm structure in accordance with the present invention.

Shown in FIG. 4 is a block diagram of a circuit 42 for implementing an algorithm associated with the sets of stored information of the cache 14. The circuit 42 comprises an encoder 43 having inputs for receiving the outputs Match 1–Match 4 of comparators 22–25 (FIG. 2), respectively, of cache 14. The number of inputs required equals the number of sets of data, n. An output of encoder 43 is coupled to a first input of a translator 44. An output of translator 44 is coupled to an input of a latch 45 which has an output coupled to a second input of translator 44.

In operation, a precalculated table of permutations are stored at addressable locations of translator 44. Although in a preferred form, the precalculated permutations discussed are used to implement an LRU algorithm for cache 14, any of numerous algorithms may be implemented by analogous permutations. The precalculated permutations are represented by binary numbers each of which has a bit length which is large enough to represent p permutations where p is represented by:

$$p = (n!)/(n-R)!$$

where R = the number of sets operated on simultaneously.

For example, when four sets of stored information are used or operated on simultaneously, 4! or twenty-four possible permutations of the order of the four sets exist.

Shown in FIG. 5 is an example of a permutation table which may be used with translator 44 to implement an LRU algorithm. The table of FIG. 5 contains the twenty-four permutations of four sets of stored information, each unique permutation being the top number of twenty-four groups of numbers arranged in a hierarchy. Each of the four sets is represented by a predetermined position with the left most digit representing the first set and the right most digit representing the fourth set. In this manner, each set is characterised by being either 0, 1, 2 or 3 where 3 represents a set that is the most recently used (MRU) and 0 represents a set that is the least recently used (LRU). For each of the twenty-four permutations shown, there are three other associated groupings of numbers which represent the progression of the algorithm when the remaining sets become the MRU. In other words, for each of the twenty-four groups, the digit 3 is associated with each set once. An asterisk at the end of any associated grouping of permutations shown in FIG. 5 indicates that the particular permutation number has already been used as the first number of another grouping in the hierarchial progression. Therefore, this permutation and an associated grouping will not be found repeated below that group as the first number of another group. However, for each permutation number which has not been repeated, the permutation and its associated groupings may be found at the next lower level. At the lowest level in the hierarchial progression of permutation numbers, the remaining three permutation numbers of each grouping have already been used as a first permutation number of another group. Therefore, asterisks are not indicated on all of these permutation numbers.

An example of the first grouping of permutation numbers of the table of FIG. 5 readily illustrates the significance of the table and the operation of circuit 42. It should readily be apparent that the table of FIG. 5 is not unique in that twenty-three other analogous tables may be used depending upon which permutation is chosen first. In the example table of FIG. 5 the number 0123 is arbitrarily chosen as the first number. This means that set four is the MRU set and set one is the LRU set. Whenever a set is addressed via the Match 1–Match 4 signals, a new output indicating the next MRU and LRU sets will be provided at the output of translator 44 in accordance with the following table:

| New Set Access | Present LRU Status | New LRU Status |
| --- | --- | --- |
| 4 | 0123 | 0123 |
| 3 | 0123 | 0132 |
| 2 | 0123 | 0312 |
| 1 | 0123 | 3012 |

For example, if the present status of the four sets is 0123 and set four is accessed, the status remains the same since set four is still the MRU set. If set three is accessed, the new status is 0132 wherein set three is the MRU set, set one is still the LRU set, set two is still the next least recently used set designated by a 1 and set four is now the next most recently used designated by a 2. The four permutation numbers in the above table under the new LRU status column represents one of the twenty-four groups of permutation numbers shown in FIG. 5. The permutation numbers 0132, 0312 and 3012 are then used as the first number of three groups of permutation numbers on a second level of the hierarchy. The remaining groups of permutation numbers are in the third and fourth levels.

Each group of four permutation numbers represents the new status existing after one of the four sets has been accessed with the top permutation number representing the present status of the four sets. Therefore, latch 45 provides translator 44 with the present LRU status. Initially, an arbitrary permutation number may be stored in latch 45. In the example table of FIG. 5 the initial arbitrary permutation number was chosen to be 0123. When encoder 43 signals translator 44 with a control signal which indicates which set of information is being addressed and the present status of the sets is simultaneously coupled to the other input of translator 44, a precalculated permutation number which represents the new LRU status is provided at the output of translator 44. It should be well understood that encoder 43 is not an essential feature of the invention because a single or plural control signals may be coupled directly to translator 44. It should also be obvious that larger or smaller precalculated permutation tables exist when more than or less than, respectively, four sets of stored information are used.

Furthermore, other methods for implementing the precalculated permutation numbers exist. Another approach is to always designate the left-most digit as the MRU set and the right-most digit as the LRU set, or vice-versa, and assign the digit values 0, 1, 2 and 3 to sets 1, 2, 3 and 4, respectively. Another table (not shown) which is analogous to the table of FIG. 5 may be readily created showing twenty-four permutations which exist from four sets of stored information. In either approach, the twenty-four permutations may be encoded by five bits. For both implementations, by assigning the binary value of zero to the first permutation, the initial setting of latch 45 may be established simply by clearing the register. As a result, a significant reduction of circuitry related to initialization is achieved. In a preferred form, translator 44 may be implemented by using a read-only-memory (ROM), a programmable ROM (PROM) or a programmable logic array (PLA), but it is obvious that numerous other implementations exist. Further, the invention is not limited to an LRU algorithm or limited to use with a cache and can be used in conjunction with either a full associative or a set associative cache.

By now it should be apparent that a precalculated permutation network has been provided for a structure which implements an algorithm associated with stored information. Unlike a push-down stack structure which moves status changes through a stack of registers, the provided structure has substantial advantages over a calculating circuit such as the one illustrated in FIG. 3. The present invention provides access to a new status condition in response to addressing precalculated stored information. As a result, for commonly used set sizes significantly fewer register circuits and logic are required which provide a substantial size reduction. Furthermore, flexibility to implement other algorithms exists without changing the circuit structure.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

We claim:

1. A circuit for implementing a replacement algorithm by providing a status of frequency of use of n sets of stored information in a cache thereby indicating which one of n sets of stored information can be replaced with new information in accordance with the replacement algorithm, said status of use being provided in response to a set address signal indicating which one of the n sets is presently being addressed for storing data, where n is an integer, comprising:

a plurality of comparators for providing the set address signal, said set address signal being provided in response to a comparison of both a plurality of input address indentify bits which address a predetermined storage location in one of the n sets in the cache, and address bits associated with label fields of the n sets which identify address locations of data of the n sets;

storage means having an input and an output, for storing a number having a bit length large enough to represent n! permutations of a grouping of the n sets, said stored number representing a present status of use of the n sets; and encoded translation means having a first input coupled to the output of said storage means, a second input for receiving the set address signal, and an output coupled to the input of said storage means, and having a predetermined number of address locations in which are stored precalculated permutations of the grouping of the n sets, said permutations being arranged in groups which implement the replacement algorithm by providing an output signal in response to both the stored number and the set address signal, said output signal providing an updated status of use of the n sets of stored information.

2. The circuit of claim 1 wherein said replacement algorithm is a least recently used (LRU) algorithm for indicating the priority of use of the n sets of stored information.

3. The circuit of claim 2 wherein the precalculated n! permutations are arranged in n! groups of n numbers each with each of said n numbers having n bits in which each digit position corresponds to a predetermined one of said n sets.

4. The circuit of claim 3 wherein each of the n numbers is encoded to implement the replacement algorithm by assigning each digit a predetermined digit value to represent the priority of use of a predetermined set of stored information.

5. The circuit of claim 3 wherein each of the n numbers is encoded to implement the replacement algorithm by assigning a priority of use value to a predetermined digit location for each of said n numbers.

6. The circuit of claim 1 wherein said translation means is a read only memory circuit.

7. The circuit of claim 1 wherein said translation means is a programmable read only memory.

8. The circuit of claim 1 wherein said translation means is a programmable logic array.

9. A circuit for implementing a replacement algorithm by providing a status of frequency of use of n sets of stored information in a cache in response to a set address signal provided by the cache, the set address signal indicating which one of the n sets is presently being addressed, where n is an integer, comprising:

storage means having an input and an output, for storing a number having a bit length large enough to represent n! permutations of a grouping of the n sets, said stored number representing a present status of the replacement algorithm;

translation means having a first input coupled to the output of said storage means, a second input for receiving the set address signal, and an output coupled to the input of said storage means, and having a predetermined number of address locations in which are stored precalculated permutations of a grouping of the n sets, said permutations being arranged in groups which implement the replacement algorithm by providing an output signal in response to both the stored number and the set address signal, said output signal providing the status of frequency of use of the n sets for determining which one of n sets of stored information is to be replaced with new information;

address control means for providing the set address signal, comprising n comparator circuits, each of said n comparator circuits corresponding to a predetermined one of the n sets and each providing a portion of the set address signal in response to a comparison of both a plurality of input address identify bits which address a predetermined storage location in one of said n sets, and address bits associated with label fields of a predetermined one of the n sets which identify address locations of data of the predetermined set; and an encoder for receiving and encoding the set address signal before coupling the set address signal to the translation means.

10. A method of implementing a replacement algorithm by providing a status of frequency of use of n sets of stored information in a cache in response to an address signal which addresses a predetermined one of the n sets, where n is an integer, comprising the steps of:

receiving a plurality of set address identify bits which address a predetermined storage location in one of the n sets of the cache;

comparing the received set address identify bits with address bits associated with label fields of the n sets which identify data location to provide a set location to provide a set location signal;

providing addressable translation means having a predetermined number of address locations in which are stored precalculated permutations of a number having a bit length large enough to represent n! permutations of a grouping of the n sets, said precalculated permutations providing information for implementing the algorithm by providing encoded data related to replacement of stored information;

providing a storage means having a bit length large enough to represent n! permutations of a grouping of the n sets, said stored number representing a present status of the replacement algorithm;

coupling an input of said storage means to an output of the translation means and coupling an output of the storage means to a first input of the translation means, for storing a most recently addressed permutation present at the output of the translation means in the storage means and selectively providing the most recently addressed permutation to the first input of the translation means;

coupling the set location signal to a second input of the translation means; and outputting a predetermined permutation stored in said translation means in response to both the most recently addressed permutation in the storage means and the set location signal, said predetermined permutation indicating a status of frequency of use of the n sets for use in implementing the replacement algorithm.

11. The method of claim 10 further comprising the step of:

storing an arbitrary initial permutation in said storage means prior to outputting a first permutation, said initial number being an arbitrary one of said stored precalculated permutations of the number.

* * * * *